May 29, 1934.　　　　O. A. ROSS　　　　1,960,514
LIGHT DIRECTING APPARATUS
Filed May 12, 1928
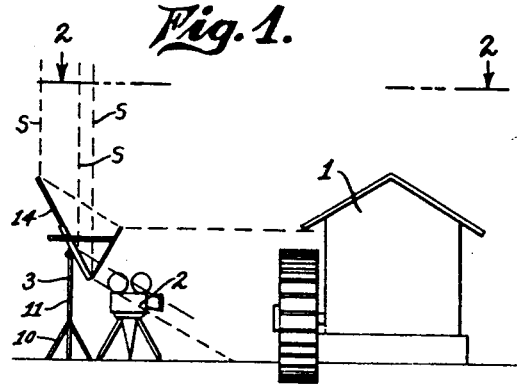
Fig. 1.
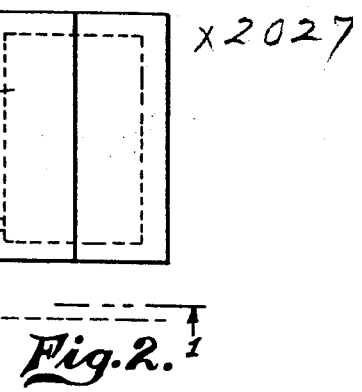
Fig. 2.
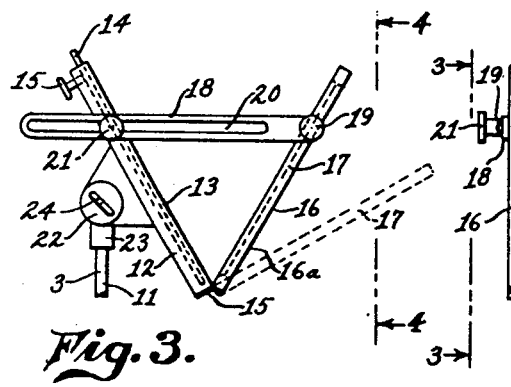
Fig. 3.
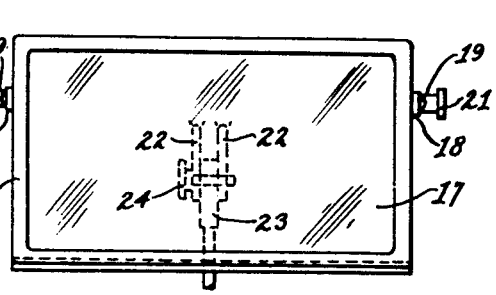
Fig. 4.
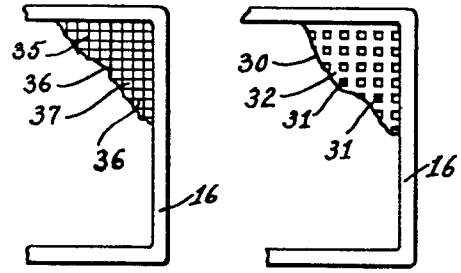
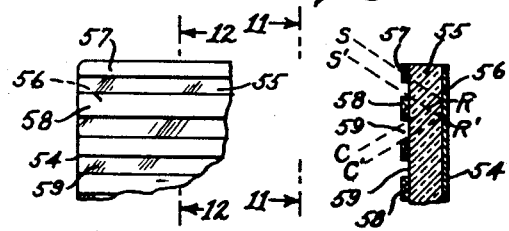
Fig. 11.　Fig. 12.
Fig. 6.　Fig. 5.
Fig. 9.
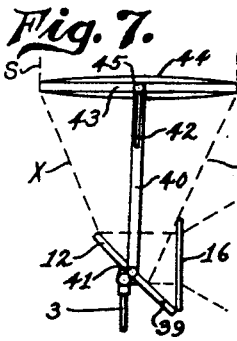
Fig. 7.
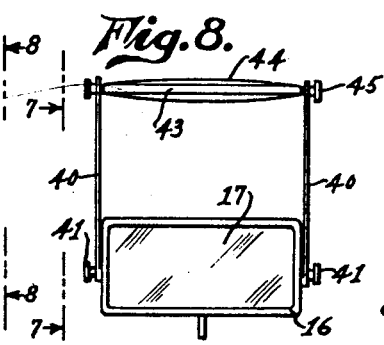
Fig. 8.
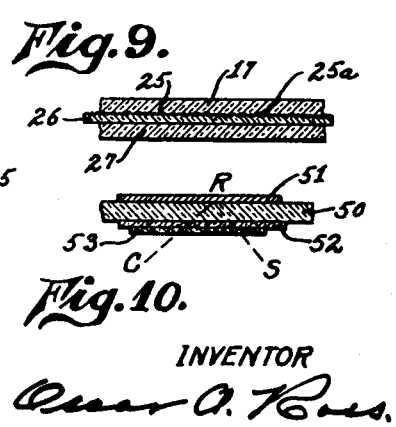
Fig. 10.
INVENTOR
Oscar A. Ross Patented May 29, 1934

1,960,514

UNITED STATES PATENT OFFICE 1,960,514

LIGHT DIRECTING APPARATUS

Oscar A. Ross, New York, N. Y.

Application May 12, 1928, Serial No. 277,152

11 Claims. (Cl. 88—1)

This invention relates to photography and more particularly to that class of photography wherein a panchromatic emulsion is employed on the film or plate on which the photographic image is to be impressed.

During the preceding year panchromatic film stock has largely supplanted the ordinary, or monochromatic film stock for use as negative stock in motion picture production. Panchromatic stock, however, as now manufactured, has a comparatively low spectrophotometric sensitivity in the green, yellow and red portions of the visible spectrum, whereas the sensitivity is comparatively high in the violet and blue portions thereof. Whereas the photographic rendering of motion pictures is much improved pictorially by the use of panchromatic film stock, the use of daylight in conjunction therewith for illuminating the subjects to be photographed has produced negatives showing disparity in representative color renderings where the subjects, or sets have comprised a number of varied colored objects. It has therefore been found necessary to carefully consider color schemes in the building of sets and the choice of costumes. With sunlight as the source of illumination for the sets, color filters have been added to the camera objectives for the purpose of reducing the more active light rays in the ultra violet and blue portions of the spectrum. The use of such filters requires intimate knowledge of the light intensity distributed upon the set and the peculiar characteristics of the particular filter employed. These filters have the further disadvantages, in that they substantially reduce the amount of light admitted to the film and therefore require that intense and blinding beams of light be thrown on the actors in the set, much to their discomfort.

In combination with taking motion pictures with cameras containing panchromatic film stock, the applicant has conceived the novel arrangement of employing reflector units in the path of sunlight rays, said units being formed to modify the color of spectral characteristics of the light beam directed on a set or subject to be photographed, in this manner dispensing with the use of a color filter on the camera objective. Whereas reflector units are at present employed to reflect a beam of solar rays onto sets or subjects to be photographed, no attempt is made to modify the color characteristics of the beam. By use of the peculiar apparatus disclosed herein, a beam of light ideal in spectral color may be projected upon a subject to be photographed without the use of color filters on the camera objective whereby a more representative rendering of color values and therefore a more pleasing pictorial rendering may be recorded on panchromatic negatives.

Furthermore as a result of the reduced intensity and more ideal spectral quality of the light projected onto sets by this invention, the actors perform under more pleasing light conditions, and therefore smoother action may be recorded.

Another object of this invention is to furnish a novel color screen or filter, positioned in front of a reflecting surface arranged to receive a beam of solar rays whereby the beam deflected by the reflector will pass through the screen and produce a spectually affected beam of light which may be directed on a set or subject to be illuminated for photographic recording onto panchromatic film.

Another object is to furnish a novel form of light reflecting unit for producing a spectrally affected light beam of high intensity.

Other advantages and novel features will appear as the description of the invention progresses, and the novel features thereof will be pointed out in the appended claims.

This invention consists in the novel construction and arrangement of parts hereinafter described, delineated in the accompanying drawing, and particularly pointed out in that portion of the instrument wherein patentable novelty is claimed for certain and peculiar features of the invention, it being understood that, within the scope of what hereinafter thus is claimed, divers changes in the form, proportions, size and minor details of the invention may be made without departing from the spirit thereof, or sacrificing any of the details thereof.

In describing the invention in detail reference is had to the accompanying drawing wherein I have illustrated embodiments of the invention, and wherein like characters of reference designate corresponding parts throughout the several views, and in which:—

Figure 1 is a side elevational view of a subject or set to be photographed and is taken on line 1—1 of Fig. 2. Fig. 2 is a plan of the same taken on line 2—2 of Fig. 1. Fig. 3 is a side elevational view of one form of color light deflecting unit taken on line 3—3 of Fig. 4. Fig. 4 is a front elevational view of the same taken on line 4—4 of Fig. 3. Figs. 5 and 6 show modified forms of color screens. Fig. 7 is a side elevational view of a modified form of color light deflecting unit taken on line 7—7 of Fig. 8. Fig. 8 is a front elevational view of the same taken on line 8—8 of Fig. 7. Fig. 9 is a sectional view of a portion of a screen. Fig. 10 is a sectional view of a portion of a modified form of mirror. Fig. 11 is a plan view of another modified form of mirror taken on line 11—11 of Fig. 12, and Fig. 12 is a sectional view thereof taken on line 12—12 of Fig. 11.

Referring to Figs. 1 and 2, the set, or subject 1 is assumed to be a water-driven grist mill exteriorly located, as distinguished from a studio set, and is ordinarily illuminated by sunlight. The set 1 is assumed to be in action and the camera 2 in position for photographically recording such action, the camera being further assumed to be loaded with panchromatic film stock. The set is further assumed to comprise various colored objects and elements which it is desired to photographically record in representative color values. For the purpose of properly illuminating the various surfaces of the colored objects referred to, certain improved color light beam projecting units as 3—3 hereinafter more fully described, have been supplied to project spectrally affected light beams onto the set whereby ideal pictorial rendering as well as a more realistic representative rendering of color values will be impressed on the panchromatic film as the action is photographically recorded by camera 2.

Referring to Figs. 3 and 4, the color light deflecting unit 3, of which the lower portion or tripod 10 and height adjusting tube 11 has been omitted, comprises a frame member 12 secured to the upper face of which is a mirror, or reflector 13, and in the interior of which is a secondary slidable mirror or reflector 14 which may be adjustably positioned with respect to the frame by an adjusting screw 15. Pivotally supported at the lower edge of frame 12 by hinge 15, is a screen frame 16, supporting a color screen 17. Suitable brackets 18—18, one end of which is pivotally secured to frame 16 by screws 19—19, are arranged to be adjustably positioned by means of adjusting screws 21—21 operating in slots 20, whereby the relative position of the mirrors 13 and 14 and color screen 17, may be varied. The frames 12 and 16 are adjustably supported on the vertically adjusted tube 11 by means of brackets 22—22 arranged to be clamped to head 23 by screw 24. The color screen 17 is preferably composed of transparent sheet material 25 (Fig. 9), as for example, glass or gelatin to which a comparatively thin coating of colored gelatin 26 or similar transparent material has been applied, and over which a protective coating, or sheet, as 27, has been applied, or cemented. The surface 25a of transparent sheet 25 is preferably etched or sand-blasted and the materials 26 and 27 made of elements having differing indices of refraction whereby the light rays passing through screen 17 are not only changed in color characteristics, but also are caused to diverge relatively whereby the beam leaving the color screen will be diffused and non-glaring.

Referring to Fig. 5, the modified screen 30 may be made of the same materials and in the same manner as described in connection with screen 17, or may be made from colored base stock ordinarily employed in motion picture film negatives. However, the screen 30 is modified by the addition of orifices 31—31 therein through which the normal solar light rays, deflected by the mirrors 13 and 14, are permitted to freely pass. However the orifices are made sufficiently small whereby a circle of confusion is partially established and therefore the rays passing through said orifices are diverged and blended with the spectrally affected rays passing through the non-orificed portion 32 of said screen, said blending of the rays producing a spectrally affected and diffused beam of light when projected onto a set or subject to be illuminated.

Fig. 6 shows a modified form of screen 35, the color screen portion of which comprises a plurality of substantially cylindrical colored threads, or cords 36—36 which may be made up of colored gelatin, spun glass, or similar transparent material to which a dye has been added, and the threads of which are spacedly interwoven to form a mat having orifices as 37—37 formed between each adjacent and transverse thread, each orifice being sufficiently small to establish a partial circle of confusion whereby the light rays deflected therethrough by the mirrors 13 and/or 14, will blend with the spectrally affected light rays issuing from the colored threads, in this manner producing a diffused and colored light beam particularly adapted for illuminating a set or subject to be photographically recorded on panchromatic film.

Figs. 7 and 8 show a modified form of spectrally affected light-deflecting unit 39, comprising preferably hereinbefore described unit 3 to which is added brackets 40—40, the lower ends of which are adjustably pivotally supported on frame 12 by adjusting screws 41—41, and in which are provided slots 42—42, for vertically adjustably positioning the lens frame 43 supporting condensing lens 44, screws 45—45 acting to adjustably clamp the frame in various positions on brackets 40—40. The solar rays S—S entering the upper surface of lens 44 are condensed into a cone of light rays X—X the apex of which impinges on the mirror 12 and is thereafter deflected through the screen member 16, whereat it is changed in spectral characteristics and issues therefrom as a colored and diffused comparatively powerful beam of light for illuminating motion picture sets.

Referring to Figure 10; if desired the screen member 16 may be omitted and the mirror 13 may be formed of a transparent material 50 having a reflecting material 51 on the reflecting side thereof and a color screen 52 on the front side thereof. When such a mirror is employed the light rays initially pass through the color screen 52 thence through the transparent material 50 whereafter they are reflected by the reflecting material 51 and again pass through the transparent material 50 in reverse direction and thence through the color screen 52 as shown by the line S—R—C. The color screen 52 is preferably protected by a transparent coating 53.

Referring to Fig. 11, showing a modified form of mirror 54, to one face of the transparent sheet 55, preferably of glass, is secured a reflecting medium 56, as for example, silver, whereas on the other face is secured a plurality of spaced variable width color line screen ribbons 57 and 58, between which are formed slits or grooves 59—59. The mirror 54 may be employed as a substitute for the mirror 13, or 14, whereupon the color screen 16 is omitted. By the novel arrangement of spacedly forming variable width color line screens, as 57 and 58 in front of a mirrored surface, as 56, light rays as S—R—C and S'—R'—C' are constrained to pass to and be reflected by the mirrored surface 56, some of the rays, as for example the rays S—R—C being first constrained to pass through a color screen as 57, thence to the reflecting surface 56 whereafter they exit from the transparent member 55 through the groove, or slit 59 to be projected onto the object to be illuminated. A ray as S'—R'—C' will be constrained to first pass through a slit, as 59, to the reflecting surface 56 whereat it is deflected and exits from the transparent member 55 through another slit 59 thereafter being projected in the direction of the subject to be illuminated without being substantially varied spectrally. Other rays will pass initially through a color screen, as 57 or 58 to the reflecting surface 56 and thence through another color screen, as 57 or 58, in other words, will be doubly varied in spectral characteristics before being projected in the direction of the subject to be illuminated. The non-affected rays, as S'—R'—C' act as carrier rays or beams of light of relatively high intensity which act to assist in the propagation of the varied color rays, as well as blending therewith whereby a diffused beam of light of preferred color is projected in the direction of the object to be illuminated. If desired the color line screens as 57 and 58, may be of differing color, or of differing shades of one color, and for use in connection with the illumination of subjects to be photographically recorded on panchromatic film, the color is preferably green, or shades thereof extending toward the yellow and red portions of the spectrum.

The color line screens, as 57 and 58, are preferably made of a transparent material, as for example gelatin to which the suitable color dye has been added. The width of the line screens is comparatively small and is preferably proportioned to the thickness of the transparent material 55, their width being also preferably proportioned to the distance the beam is to be projected onto the subject to be illuminated.

After the color line screens, as 57 and 58 have been added to the transparent member 55, they are preferably covered with a protective transparent coating, not shown, but disclosed on screen 50 of Fig. 10.

Whereas the mirror frame 12 and the screen fram 16 are shown as hinged to comprise one unit, it is pointed out that said frames may be independently mounted.

Whereas a transparent medium, as glass, has been shown having the reflecting surface 56 supported thereon, the reflecting surface may be made of metal, as for example, chromium plated onto copper, or brass, and the color screen lines added directly onto said plated surfaces a layer of transparent material being interposed solely between the plated surface and the color screen.

Whereas the color screens, as 57 and 58 are shown as spaced longitudinal strips, they may be formed as circular, square, or irregular shaped disks spacedly arranged over the mirrored surface, suitable corresponding transparent disks, or a continuous coating of transparent material being interposed between the reflecting surface and said disks.

When it is desired to "shoot" exterior sets as shown by Figs. 1 and 2, the improved color light deflecting units, as 3 and/or 39 are positioned whereby the solar rays X—X are caused to impinge on the mirrors 13 and/or 14 at an angle whereby the reflected beam of sunlight from said mirrors is constrained to pass through the color screens 16—16 and thence onto the subject, as 1, to be photographed, said color screen being adjusted relatively to the mirror whereby the beam projected thereby will be directed onto the particular portion of the subject to be illuminated. Inasmuch as the particular color combination of the beam has been established to correlate with the particular class of film employed in the camera, ideal pictorial rendering as well as representative rendering of color values will be recorded thereon, these ideal renderings being obtained without the use of color filters on the camera objectives, or the use of abnormal light sources which often interferes with the proper performance of the actors.

Whereas with panchromatic film stock, as now manufactured, it is preferred to employ color screens producing a beam of light rays in which the preponderance of the rays is produced in the green portion of the spectrum, it is apparent that future experiments may produce a film wherein a color other than green, may have comparatively low photographic recording values, and therefore applicant does not wish to limit himself to the use of any particular color.

What I claim is:—

1. Light directing apparatus comprising, a base member, a reflector member pivotally supported thereby arranged to redirect a beam of light received by the reflecting surface thereof, a light ray condensing member arranged to condense the light beam into a more intense light beam, and means connecting the members arranged to adjustably position the condensing member with respect to the reflecting surface of the reflector member whereby the condensing member may be positioned to intercept the light beam received and redirected by the reflector member independently of the angularity between the axis of the light beam and the reflecting surface of the reflector member.

2. Light directing apparatus comprising, a base member, a reflector member pivotally supported thereby arranged to redirect a beam of light received by the reflecting surface thereof, a color screen member positioned in angular displaced relation thereto arranged to intercept the light beam for affecting the color of the redirected light beam, means connecting the members for adjustably varying the angular displacement therebetween whereby the color screen member may be caused to intercept the light beam independently of the angularity thereof as received and redirected by the reflecting member, a light ray condensing member arranged to condense the light rays into a more intense light beam, and means connecting the reflector member and the condensing member for adjustably positioning the condensing member with respect to the reflector member whereby the condensing member may be positioned to intercept the light beam received and directed by the reflector member independently of the angularity between the axis of the light beam and the reflecting surface of the reflecting member.

3. In light directing apparatus, a pivotally supported light redirecting member, a light condensing member arranged to direct condensed light onto the light redirecting member, and connecting members having one end thereof pivotally supported and the other end thereof arranged to position the condensing member at predetermined and variable pivoted and bodily fixed positions with respect to the light redirecting member.

4. In light directing apparatus, a light transmitting member having spaced parallel surfaces, a silvered reflecting membrane on one of the surfaces, and light transmitting colored membranes formed spacedly on the other surface of the light transmitting member.

5. In light directing apparatus, a transparent member having spaced surfaces, a light reflecting membrane on one of the surfaces arranged to reflect light passing through the member, and light transmitting colored membranes formed spacedly on the other surface of the transparent member.

6. In a light directing apparatus, a transparent member having spaced surfaces, a light reflecting membrane on one surface, and light transmitting colored membranes of substantially uniform area formed spacedly on the other surface of the transparent member.

7. In light directing apparatus, a transparent member having spaced surfaces, a light reflecting membrane on one surface, and light transmitting colored membranes of substantially uniform area formed spacedly and symmetrically on the other surface of the transparent member.

8. In light directing apparatus, a transparent member having spaced surfaces, a light reflecting membrane on one surface, and light transmitting colored ribbon shaped membranes formed spacedly on the other surface of the transparent member.

9. In light directing apparatus, a transparent member having spaced plane surfaces, a light reflecting membrane on one of the surfaces, light transmitting colored membranes of substantially uniform area formed spacedly on the other face of the member, and means for pivotally supporting the member for receiving light from a source thereonto.

10. In light directing apparatus, a light redirecting member arranged to redirect light projected thereonto, a color screen member for affecting the color of the light redirected by the light redirecting member, a color screen supported by the color screen member for varying the color of the light redirected therethrough, certain symmetrically spaced areas of the screen being clear for transmitting the redirected light therethrough without affecting the color thereof, and means for positioning the light directing member in predetermined and variable angular positions with respect to the color screen member.

11. In light directing apparatus, a light redirecting member, a color screen member, a color screen supported thereby for varying the color of the light redirected by the light redirecting member, clear areas of uniform area uniformly spaced on the color screen for transmitting the redirected light without varying the color thereof, and means for positioning the light redirecting member in predetermined and variable fixed angular positions with respect to the color screen member.

OSCAR A. ROSS.